Patented Jan. 11, 1944

2,338,709

UNITED STATES PATENT OFFICE 2,338,709

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application October 30, 1941, Serial No. 417,167

14 Claims. (Cl. 260—156)

This invention relates to new azo compounds and their application to the art of dyeing or coloring. Textile materials such as organic derivatives of cellulose, wool, silk, "Nylon" and "Vinyon" and lacquers composed of cellulose esters, cellulose ethers and vinyl derivatives, for example, can be colored. Coloration can be effected by dyeing, printing, stencilling or other suitable methods.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While my invention will be illustrated more particularly in connection with the coloration of cellulose acetate, a material to which the invention is especially adapted, it will be understood that it applies equally to the coloration of the other materials just mentioned.

It is an object of my invention to provide a new class of azo compounds. Another object is to provide a process for the dyeing or coloration of various textile materials including organic derivatives of cellulose, wool, silk, "Nylon" and "Vinyon" textile materials. A further object is to provide dyed textile materials which are of good fastness to light and washing. Other objects will hereinafter appear.

The azo compounds of my invention by means of which the above objects are accomplished or made possible consists of the azo compounds having the formula:

wherein R stands for a member selected from the group consisting of a benzene nucleus and an azobenzene nucleus, $R_1$ stands for a member selected from the group consisting of a benzene nucleus and a naphthalene nucleus, X stands for a piperidine nucleus joined through its nuclear nitrogen atom to a carbon atom of the member $R_1$ which is in para position to the azo bond, OY stands for a member selected from the group consisting of a hydroxy group, a $ONH_4$ group, an O-alkali-forming metal, an alkoxy group, an

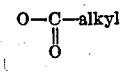

group, a sulfato group, a phosphato group and a phosphito group and $n$ stands for a member selected from the group consisting of 2 and 3.

Ordinarily R and $R_1$ are benzene nuclei, while the piperidine nucleus X usually has no substituents other than those specifically indicated in the above formula. Similarly, Y is normally hydrogen, ammonium or an alkali-forming metal such as sodium, potassium or calcium. Nuclear non-sulfonated compounds wherein R and $R_1$ are benzene nuclei are advantageously employed when cellulose acetate silk is to be colored.

Compounds wherein the diazonium compounds employed are derived from an amine having the formula

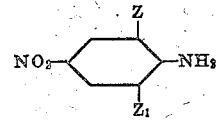

wherein Z and $Z_1$ each stand for a member selected from the group consisting of hydrogen, a halogen atom, a nitro group, a hydroxy group, an alkyl group, an alkoxy group, an alkyl sulfone group, a sulfonamide group and a carboxyl group appear to be advantageous.

The azo dye compounds of my invention yield a wide variety of shades. Depending upon the particular components employed, orange, pink, blue, violet, red and rubine shades, for example, can be obtained. Generally speaking, the colorations obtained are of excellent fastness to light and washing and can be discharged to clear whites. For the coloration of organic derivatives of cellulose nuclear non-sulfonated dye compounds which are preferably free of a nuclear carboxylic acid group in either its free acid or salt form should be employed. The nuclear non-sulfonated dye compounds can likewise be employed to color the other materials named herein. The nuclear sulfonated compounds possess little or no applicability for the coloration of organic derivatives of cellulose but can be employed for the coloration of wool and silk by known methods for the coloration of these materials. These sulfonated compounds can be prepared, for example, by sulfonation of the unsulfonated compounds.

The azo compounds of my invention on reduction yield p-amino-(phenyl or naphthyl)-piperidines which are valuable as antioxidants for gasoline and as photographic developers in the preparation of colored photographic films.

The azo compounds of my invention can be prepared by coupling diazotized aniline and aminoazobenzene compounds with the coupling components having the formula:

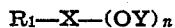

wherein $R_1$, $X$, $OY$ and $n$ have the meaning previously assigned to them.

The following examples illustrate the preparation of the azo compounds of my invention:

*Example 1*

1 gram mole of 1-amino-2-chloro-4-acetobenzene is diazotized in known fashion and the diazonium compound obtained is added to a cold hydrochloric acid solution of 1 gram mole of N-phenyl-3,4,5-trihydroxypiperidine. The coupling reaction which takes place is completed by adding sodium acetate until the reaction mixture is neutral to Congo red paper. The dye compound formed is recovered by filtration, washed with water and dried. The dye compound obtained has the formula:

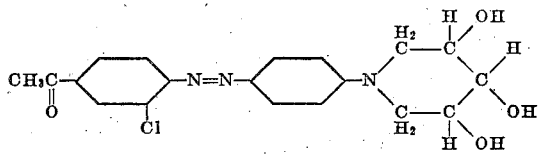

and colors cellulose acetate silk and the other textile materials named herein orange.

1 gram mole of diazotized p-aminoacetophenone can be substituted for the diazonium compound of the example to obtain a dye compound which similarly colors the materials above identified orange.

*Example 2*

1 gram mole of diazotized p-nitroaniline is coupled with 1 gram mole of m-methyl-N-phenyl-3,5-dihydroxypiperidine. Coupling and recovery of the dye compound formed can be carried out in accordance with the procedure described in Example 1. The dye compound obtained yields red shades.

*Example 3*

1 gram mole of diazotized 1-amino-2-chloro-4-nitro-benzene is coupled with 1 gram mole of m-methyl-N-phenyl-3,4,5 - trihydroxypiperidine. The dye compound obtained colors cellulose acetate silk rubine shades.

*Example 4*

1 gram mole of diazotized 1-amino-2-hydroxy-4-nitro-benzene is added slowly to an aqueous solution of m-methoxy-N-phenyl - 3,4,5 - trihydroxypiperidine monosulfatosodium salt. Concurrently with the addition of the diazonium solution, a sodium bicarbonate solution is added at such a rate that the reaction mixture is maintained just neutral. Upon completion of the coupling reaction which takes place, the dye compound formed is precipitated by adding sodium chloride, recovered by filtration and dried. The dye compound obtained colors cellulose acetate silk, wool, silk and "Nylon" pink shades from an aqueous solution of the dye which may contain a salt such as sodium chloride. By "monosulfatosodium salt" is meant that the equivalent of one hydroxyl group is replaced by the sulfato group in its sodium salt form. The exact location of the monosulfato group is not known but it is probable that a partial replacement of each of the hydroxyl groups takes place.

*Example 5*

1 gram mole of

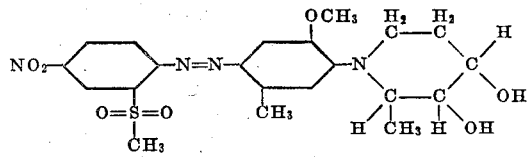

is dissolved in pyridine and treated at room temperature with 1 gram mole of

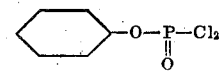

The reaction which takes place is completed by warming the reaction mixture on a steam bath following which an aqueous solution of sodium bicarbonate is added to the reaction mixture and the pyridine removed by distillation under reduced pressure. The phosphate compound formed is precipitated from the reaction mixture by the addition of sodium chloride and is recovered by filtration. In the reaction described the equivalent of one of the hydroxyl groups present in the 3- and 4-positions of the piperidine nucleus is converted to a

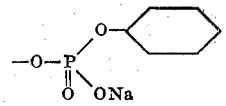

group. The dye compound obtained colors the textile materials named herein violet shades. By the use of 1 gram mole of

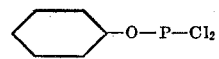

in the above reaction in place of the reactant used the corresponding phosphite dye compound can be formed. This dye compound similarly yields violet shades.

*Example 6*

1 gram mole of 2,4-dinitroaniline is diazotized with nitrosyl sulfuric acid and the diazonium compound obtained is poured into water. The diazonium solution obtained is then added to a cold dilute hydrochloric acid solution containing 1 gram mole of 2-methoxy-5-acetamino-N-phenyl-3-methoxy-4,5-dihydroxy piperidine having the formula:

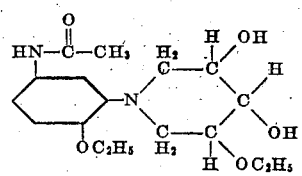

The coupling reaction which takes place is completed by adding sodium acetate until the reaction mixture is neutral to Congo red paper. The dye compound obtained colors cellulose acetate silk and the other textile materials named blue.

Example 7

1 gram mole of diazotized 1 amino-2-chloro-4,6-dinitrobenzene is coupled as in Example 6 with 1 gram mole of

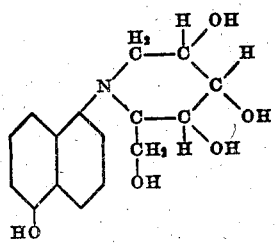

The dye compound obtained colors cellulose acetate silk blue.

Example 8

1 gram mole of diazotized 2-amino-3,5-dinitrobenzene sulfonethylamide is coupled in an acetic acid solution with 1 gram mole of

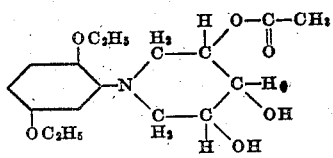

The dye compound obtained colors cellulose acetate silk reddish-blue shades.

Example 9

1 gram mole of diazotized p-nitroaniline is coupled in a hydrochloric acid solution with 1 gram mole of N-phenyl-3,4,5-trihydroxypiperidine. The dye compound obtained colors cellulose acetate silk red.

Example 10

1 gram mole of 1-amino-2-monoethylsulfonamide-4-nitrobenzene is diazotized and the diazonium compound obtained is coupled in a hydrochloric acid solution with 1 gram mole of N-phenyl-3,4,5-trihydroxypiperidine. The dye compound obtained colors cellulose acetate silk a pinkish-rubine shade.

1 gram mole of m-methyl-N-phenyl-3,4,5-trihydroxypiperidine can be substituted for the coupling component of the above example, coupling being effected in an acetic acid solution, to obtain a dye which similarly colors cellulose acetate silk pinkish-rubine shades.

Example 11

1 gram mole of diazotized p-aminoazobenzene is coupled in an acetic acid solution with 1 gram mole of N-phenyl-3,4,5-trihydroxypiperidine. The dye compound obtained colors cellulose acetate silk orange.

It will be understood that if desired the p-aminoazobenzene can be applied to the cellulose acetate fabric, diazotized thereon and coupled with the component just mentioned.

Example 12

1 gram mole of diazotized 1-amino-2-methoxy-4-nitrobenzene is coupled in an acetic acid or hydrochloric acid solution with 1 gram mole of

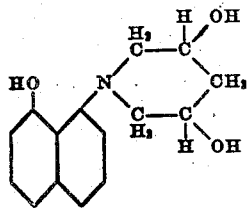

The dye compound obtained colors cellulose acetate silk reddish-blue.

Example 13

1 gram mole of diazotized 1-amino-2-methyl-4-nitrobenzene is coupled in a hydrochloric acid solution with 1 gram mole of

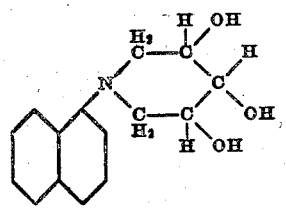

The dye compound obtained colors cellulose acetate silk red.

Example 14

1 gram mole of o-methoxybenzeneazocresidine is applied to a cellulose acetate fabric (3% dyeing, for example) diazotized thereon and then coupled with 1 gram mole of N-phenyl-3,4,5-trihydroxypiperidine. The cellulose acetate fabric is colored red.

1 gram mole of 4'-dimethylamino-4-aminoazobenzene can be substituted for the o-methoxybeneazocresidine of the example to obtain a cellulose acetate silk fabric which is colored red.

Example 15

1 gram mole of

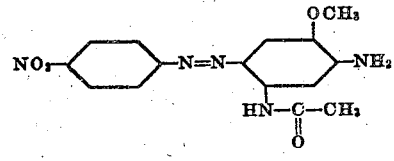

is applied to the cellulose acetate fabric (1% by weight of dye) yielding a red coloration thereon. The fabric is then washed with water following which it is treated with aqueous nitrous acid to diazotize the free amino group of the dye. Upon completion of the diazotization reaction, the fabric is again washed and then treated with an aqueous suspension of m-monoacetylamino-N-phenyl-4,5-dihydroxypiperidine. The cellulose acetate fabric is colored a deep Navy blue shade which can be discharged to a pure white.

The following tabulation further illustrates the compounds included within the scope of my invention together with the colors they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 15, inclusive.

| Amine | | Coupling component | Color |
|---|---|---|---|
| Aniline | 1. | [N-(2-chlorocyclohexyl)-3,4,5-trihydroxypiperidine structure] | Yellow. |
| Do | 2. | [N-phenyl piperidine with phosphate ester structure] | Do. |
| Do | 3. | [N-phenyl piperidine with propionyloxy structure] | Do. |
| Do | 4. | [N-naphthyl piperidine with diethyl phosphate structure] | Do. |
| Do | 5. | [N-naphthyl piperidine with methoxy and ethoxy groups] | Do. |
| p-Nitroaniline | 1 to 5 above | | Orange to rubine. |
| 1-amino-2,4-dinitro-6-(Cl, Br)-benzene | do | | Orange to blue. |
| 1-amino-2,4-dinitro-6-cyanobenzene | do | | Do. |
| 1-amino-2-aceto-4-nitrobenzene | do | | Orange to rubine. |
| 5-nitro-2-aminophenylmethylsulfone | do | | Do. |
| p-Aminoazobenzene | do | | Do. |

It will be understood that the examples given herein are intended to be illustrative and not limitative of my invention. Thus, any of the diazonium compounds disclosed herein can be coupled with any of the coupling components disclosed herein to obtain dye compounds of the invention.

Sulfonated amines which can be diazotized and the diazonium compounds obtained coupled with any of the coupling components shown herein to obtain dye compounds of my invention include, for example, p-sulfanilic acid, metanilic acid, 1-amino-2-sulfonic-4-nitrobenzene, 1-amino-2,4-disulfonic benzene and 1-amino-2-chloro-4-sulfonic benzene. As previously indicated, the sulfonated compounds are useful for the coloration of wool and silk. The compounds prepared, for example, from diazotized p-sulfanilic acid and N-phenyl-3,4,5-trihydroxypiperidine yields red shades while that obtained from diazotized 1-amino-2-sulfonic-4-nitrobenzene and m-methyl-N-phenyl-3,4,5-trihydroxypiperidine yields rubine shades.

N-phenyl hydroxypiperidine and N-naphthyl hydroxypiperidine compounds can be prepared by reacting an aniline or amino-naphthalene compound with a 1,5-dihalopentane diol or triol. Suitable aniline or aminonaphthalene compounds include those indicated by the coupling components disclosed herein. Illustrative 1,5-dihalopentane diol or triol compounds include

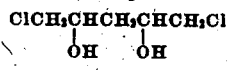

and

for example.

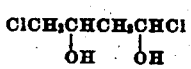

can be prepared by the action of hypochlorous acid (HOCl) on $CH_2=CH-CH_2-CH=CH_2$ after the direction of Chemiker Zeitung, 1914, I page 754.

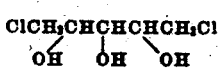

can be prepared by chlorinating pentane 2,3,4-triol.

It is here noted that the term "Nylon" refers to a linear polyamide resin which is believed to be basically described or claimed in U. S. Letters Patent 2,071,250, issued February 16, 1937, to Wallace H. Carothers. The term "Vinyon" refers to a vinyl chloride-vinyl acetate copolymer. This material is more completely identified at pages 73 and 74 of "Synthetic Organic Chemicals," 10th edition, published October 15, 1940, by Carbide & Carbon Chemicals Corporation.

The nuclear non-sulfonated azo compounds of my invention are, for the most part, relatively insoluble in water. They can be advantageously directly applied to the textile materials named herein in the form of an aqueous suspension which can be prepared by grinding the dye to a paste in the presence of a sulfonated oil, soap or other suitable dispersing agent and dispersing the resulting paste in water.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents, together with the amounts that may be employed, are disclosed in McNally and Dickey Patent No. 2,115,030, issued April 26, 1938. The process disclosed in this patent for the dyeing of cellulose acetate silk can be used in applying the nuclear non-sulfonated dyes of the present application to this material specifically as well as the other textile materials named herein.

The nuclear sulfonated dye compounds can be applied for the dyeing of wool and silk by methods known in the art for the dyeing of these materials. They can, for example, be applied directly to wool and silk by the method disclosed for the coloration of cellulose acetate silk, except that in many cases the dye will be sufficiently soluble as to render the use of a dispersing agent unnecessary. It is here noted that, while colors yielded by the nuclear non-sulfonated dye compounds have been given primarily with reference to cellulose acetate silk, the other materials named herein are colored generally similar shades.

I claim:

1. The azo compounds having the formula:

wherein R stands for a member selected from the group consisting of a benzene nucleus and an azobenzene nucleus, $R_1$ stands for a member selected from the group consisting of a benzene nucleus and a naphthalene nucleus, X stands for a piperidine nucleus joined through its nuclear nitrogen atom to a carbon atom of the member $R_1$ which is in para position to the azo bond, OY stands for a member selected from the group consisting of a hydroxy group, a $ONH_4$ group, an O-alkali-forming metal, an alkoxy group, an

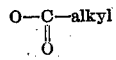

group, a sulfato group, a phosphato group and a phosphito group and n stands for a member selected from the group consisting of 2 and 3 and wherein no more than one of the OY groups is an alkoxy, an

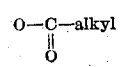

a sulfato, a phosphato or a phosphito group.

2. The azo compounds having the formula:

wherein R stands for a benzene nucleus, $R_1$ stands for a member selected from the group consisting of a benzene nucleus and a naphthalene nucleus, X stands for a piperidine nucleus joined through its nuclear nitrogen atom to a carbon atom of the member $R_1$ which is in para position to the azo bond, OY stands for a member selected from the group consisting of a hydroxy group, an $ONH_4$ group, an O-alkali-forming metal, an alkoxy group, an

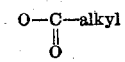

group, a sulfato group, a phosphato group and a phosphito group and n stands for a member selected from the group consisting of 2 and 3 and wherein no more than one of the OY groups is an alkoxy, an

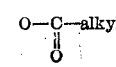

a sulfato, a phosphato or a phosphito group.

3. The azo compounds having the formula:

wherein R stands for a benzene nucleus, $R_1$ stands for a benzene nucleus, X stands for a piperidine nucleus joined through its nuclear nitrogen atom to a carbon atom of the member $R_1$ which is in para position to the azo bond, OY stands for a member selected from the group consisting of a hydroxy group, a $ONH_4$ group, an O-alkali-forming metal group, an alkoxy group, an

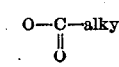

group, a sulfato group, a phosphato group and a phosphito group and n stands for a member selected from the group consisting of 2 and 3 and wherein no more than one of the OY groups is an alkoxy, an

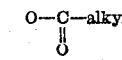

a sulfato, a phosphato or a phosphito group.

4. The azo compounds having the formula:

wherein R stands for a member selected from the group consisting of a benzene nucleus and an azobenzene nucleus, $R_1$ stands for a member selected from the group consisting of a benzene nucleus and a naphthalene nucleus, X stands for a piperidine nucleus joined through its nuclear nitrogen atom to a carbon atom of the member $R_1$ which is in para position to the azo bond and $n$ stands for a member selected from the group consisting of 2 and 3.

5. The azo compounds having the formula:

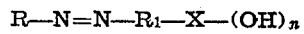

wherein R stands for a benzene nucleus, $R_1$ stands for a member selected from the group consisting of a benzene nucleus and a naphthalene nucleus, X stands for a piperidine nucleus joined through its nuclear nitrogen atom to a carbon atom of the member $R_1$ which is in para position to the azo bond and $n$ stands for a member selected from the group consisting of 2 and 3.

6. The azo compounds having the formula:

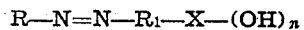

wherein R stands for a benzene nucleus, $R_1$ stands for a benzene nucleus, X stands for a piperidine nucleus joined through its nuclear nitrogen atom to a carbon atom of the member $R_1$ which is in para position to the azo bond and $n$ stands for a member selected from the group consisting of 2 and 3.

7. The azo compounds having the formula:

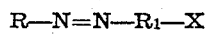

wherein R stands for a member selected from the group consisting of a benzene nucleus and an azobenzene nucleus, $R_1$ stands for a member selected from the group consisting of a benzene nucleus and a naphthalene nucleus, X stands for a 3,4,5 - trihydroxypiperidine nucleus joined through its nuclear nitrogen atom to a carbon atom of the member $R_1$ which is in para position to the azo bond.

8. The azo compounds having the formula:

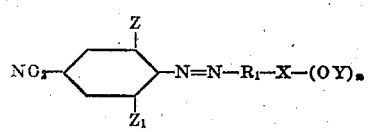

wherein Z and $Z_1$ each stand for a member selected from the group consisting of hydrogen, a halogen atom, a nitro group, a hydroxy group, an alkyl group, an alkoxy group, an alkylsulfone group, a sulfonamide group and a carboxyl group, $R_1$ stands for a member selected from the group consisting of a benzene nucleus and a naphthalene nucleus, X stands for a piperidine nucleus joined through its nuclear nitrogen atom to a carbon atom of the member $R_1$ which is in para position to the azo bond, OY stands for a member selected from the group consisting of a hydroxy group, a $ONH_4$ group, an O-alkali-forming metal group, an alkoxy group, an

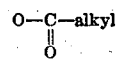

group, a sulfato group, a phosphato group and a phosphito group and $n$ stands for a member selected from the group consisting of 2 and 3 and wherein no more than one of the OY groups is an alkoxy, an

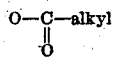

a sulfato, a phosphato or a phosphito group.

9. The azo comounds having the formula:

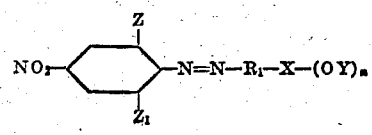

wherein Z and $Z_1$ each stand for a member selected from the group consisting of hydrogen, a halogen atom, a nitro group, a hydroxy group, an alkyl group, an alkoxy group, an alkylsulfone group, a sulfonamide group and a carboxyl group, $R_1$ stands for a benzene nucleus, X stands for a piperidine nucleus joined through its nuclear nitrogen atom to a carbon atom of the member $R_1$ which is in para position to the azo bond, OY stands for a member selected from the group consisting of a hydroxy group, a $ONH_4$ group, an O-alkali-forming metal group, an alkoxy group, an

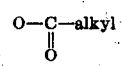

group, a sulfato group, a phosphato group and a phosphito group and $n$ stands for a member selected from the group consisting of 2 and 3 wherein no more than one of the OY groups is an alkoxy, an

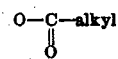

a sulfato, a phosphato or a phosphito group.

10. The azo compound having the formula:

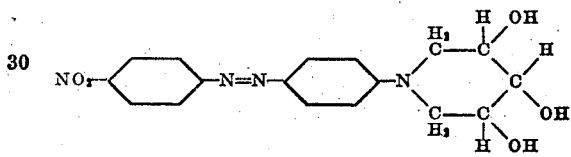

11. The azo compound having the formula:

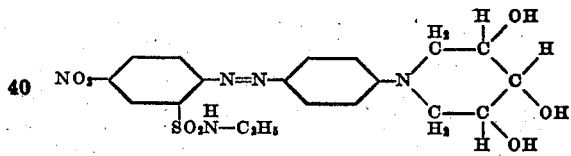

12. The azo compound having the formula:

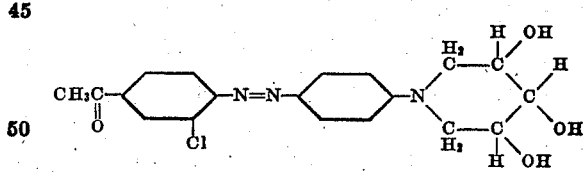

13. A cellulose acetate colored with a nuclear non-sulfonated azo dye compound having the formula:

wherein R stands for a member selected from the group consisting of a benzene nucleus and an azobenzene nucleus, $R_1$ stands for a member selected from the group consisting of a benzene nucleus and a naphthalene nucleus, X stands for a piperidine nucleus joined through its nuclear nitrogen atom to a carbon atom of the member $R_1$ which is in para position to the azo bond, OY stands for a member selected from the group consisting of a hydroxy group, a $ONH_4$ group, an O-alkali-forming metal group, an alkoxy group, an

group, a sulfato group, a phosphato group and a phosphito group and $n$ stands for a member selected from the group consisting of 2 and 3 and wherein no more than one of the OY groups is an alkoxy, an

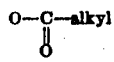

a sulfato, a phosphato or a phosphito group.

14. A cellulose acetate colored with a nuclear non-sulfonated azo dye compound having the formula:

wherein R stands for a benzene nucleus, R₁ stands for a benzene nucleus, X stands for a piperidine nucleus joined through its nuclear nitrogen atom to a carbon atom of the member R₁ which is in para position to the azo bond, OY stands for a member selected from the group consisting of a hydroxy group, a ONH₄ group, an O-alkali-forming metal group, an alkoxy group, an

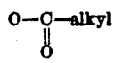

group, a sulfato group, a phosphato group and a phosphito group and $n$ stands for a member selected from the group consisting of 2 and 3 and wherein no more than one of the OY groups is an alkoxy, an

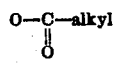

a sulfato, a phosphato or a phosphito group.

JOSEPH B. DICKEY.